Patented Sept. 14, 1937

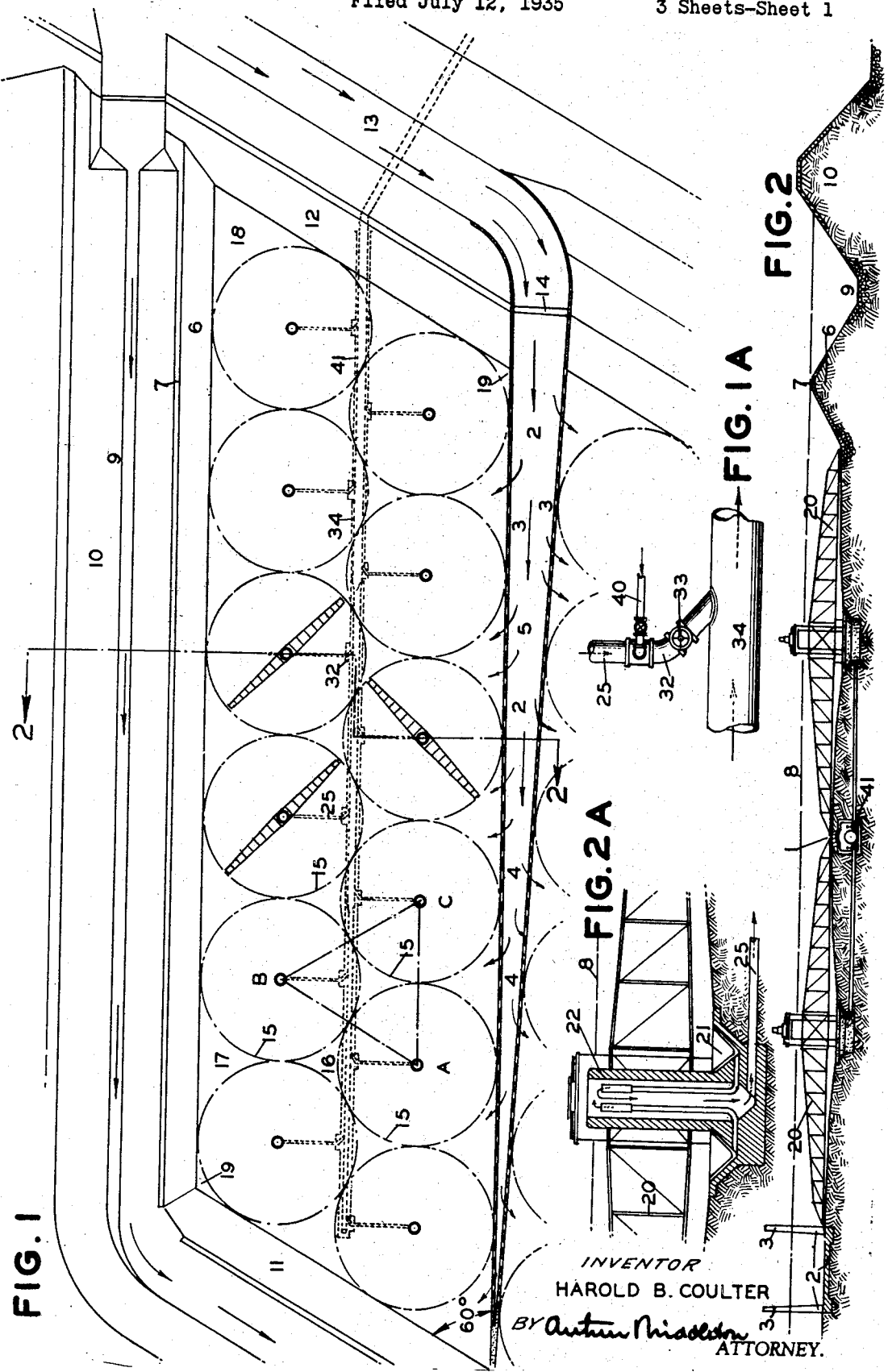

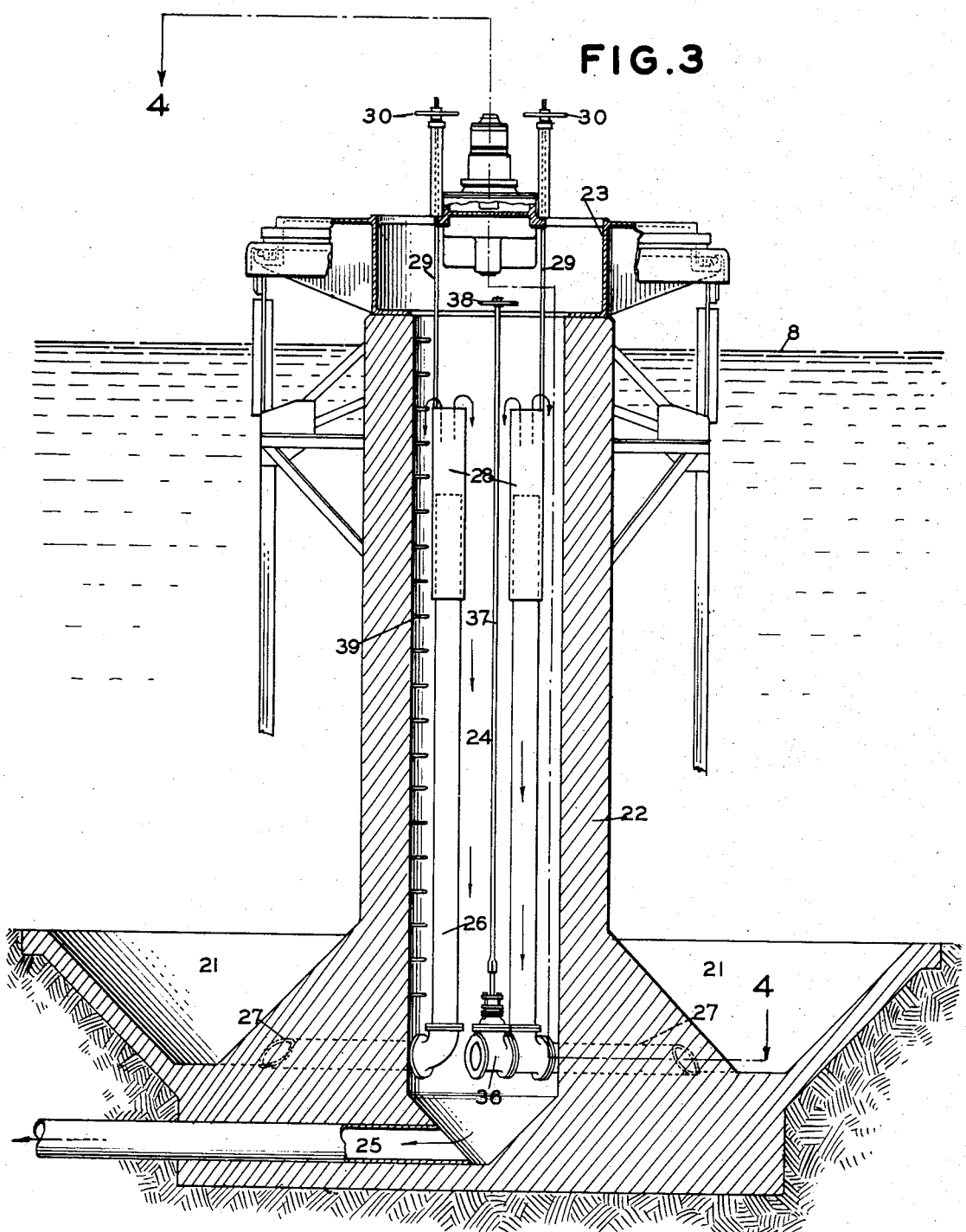

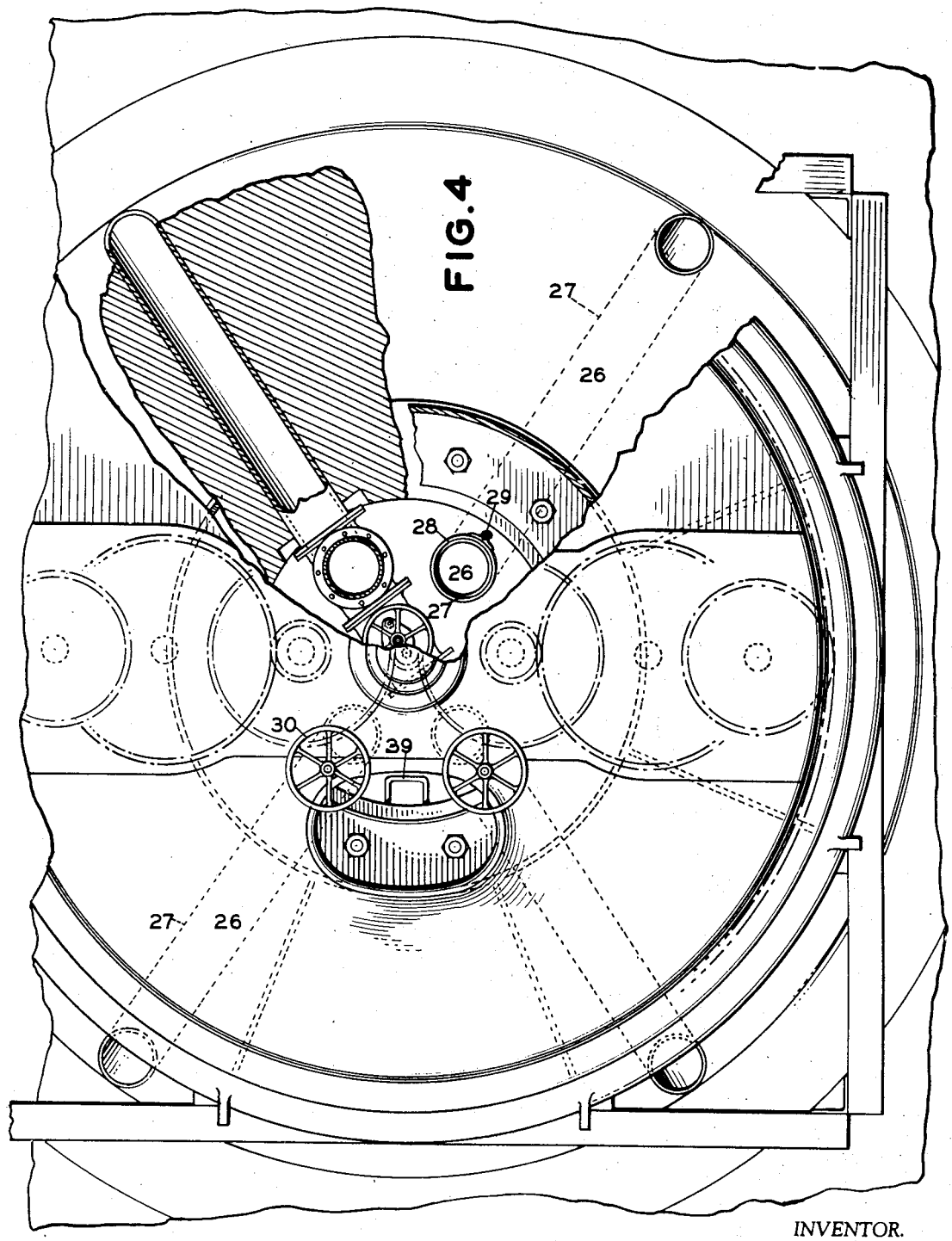

2,093,107

UNITED STATES PATENT OFFICE 2,093,107

SEDIMENTATION APPARATUS

Harold Boyd Coulter, Larchmont, N. Y., assignor to The Dorr Company, Inc., New York, N. Y., a corporation of Delaware Application July 12, 1935, Serial No. 31,123

2 Claims. (Cl. 210—55)

The invention relates to the art pertaining to the sedimentation of solids or, as otherwise expressed, to the effecting of the settling of solids contained in or in suspension in the liquid of a liquid-solids mixture.

More specifically, the invention is in respect to novel systems, apparatus and devices, and it particularly relates to the novel arranging and employing of parts which enter into the construction of, or impart novel characteristics to and which are employable in such systems, apparatus and devices.

In certain sections of the world, and particularly in certain sections of the central and western portions of the United States, the surface soil is composed of fine earthy particles or, in any event, comprises a large percentage of such type of earthy material. This may properly be described in many instances as "alluvial" soil and is thus referred to herein.

This soil is readily picked up and mixed with water flowing thereover, with the result that the streams have a decidedly muddy appearance and characteristic, either because of erosion incident to rain water flowing to the stream or incident to the stream flowing over soil of this type.

If attempt is made to divert water from the main stream for use elsewhere, as for example in the irrigation of land adjacent or even quite distant from the river, there is experienced a substantial sedimentation of the solid content of the diverted stream in such a manner that in the channel or conduit therefor there is built up a progressively increasing body of sedimented solids, which ultimately obstructs the desired flow of diverted water through the channel.

The solid content of the type referred to when experienced in rivers, is frequently referred to as silt, and the present invention may be viewed as primarily revolving about a desilting operation and an apparatus, arrangement or system for continuously performing the same. Or as otherwise expressed, the present invention revolves about an apparatus or system which has been devised and developed to effect a substantial desilting of the water diverted from a river bed prior to the delivery of the diverted water into the channel or conduit leading from the desilting system to the place of ultimate use.

While it may be feasible to operate such a system according to a batch process, nevertheless in the preferred and desired mode of operation the supply of water to the sedimenting or desilting plant should be relatively continuous; the delivery of relatively clarified or substantially desilted water as effluent from the plant to the channel leading therefrom should be relatively continuous; and there is preferably carried out a continuous removal of the solid content along another path leading from the desilting plant whereby the removed solid content is eliminated from the clarified or desilted water passing into the delivery channel or conduit.

The foregoing has been incorporated in order to orient the invention respecting the art to which it particularly pertains.

In sedimentation apparatus of the type to which the present invention relates it is old to employ a solids raking and conveying mechanism, sometimes referred to as solids raking and collecting mechanism, which is relied upon for collecting settled solids from the diverse sections of the floor or bottom of the sedimentation basin, and for delivering the solids raked and collected thereby to a place of discharge.

A type of mechanism which has proven to be extremely practical and useful in the raking, collecting and transferring of settled solids is one that comprises radiating arms revolvable about a vertically extending axis, and carrying raking blades or scrapers inclined to their path of rotary movement, whereby the settled solids are progressively raked and impelled as the result of a ploughlike action towards the central portion of the section scraped or served thereby. Such rotative arrangements, however, have been employed so that a single set of rotative mechanisms is relied upon for scraping the entire floor or bottom of the sedimentation basin.

The present invention has in view the providing of a sedimentation basin—as a single basin relatively unobstructed throughout—thus providing what may be described as a lagoon or lagoon-like basin which affords a relatively large or even enormous sedimentation zone. It is impractical to remove the settled solids by a single rotating mechanism, and according to the present invention, the floor of the sedimentation basin or desilting channel or trough, as the same may be referred to, is in effect sub-divided into contiguous floor sections arranged so that the floor surface of any one section merges with and into the floor surfaces of the sections adjacent or contiguous thereto, with the result that the large sedimentation area or zone is provided, and according to the arrangement of the present invention each of these floor sections is provided with a solids raking and conveying mechanism of the rotative type above referred to.

The central portion of each of the floor sections is provided with a receiving "cone" or receiving section into which the solids raked and transferred by the raking mechanism referred to are passed, and each floor section is also provided with means whereby the solids can pass from the collecting cone thereof into a general collecting conduit or pipe leading from the sedimenting or desilting unit. The several floor sections just referred to and the sludge raking mechanisms associated therewith, may be considered as nested or neighboring units arranged so as to permit an unobstructed passage of water from one unit to the units adjacent thereto, and it will be noted that as a result of the construction described there are avoided any cross-walls within the sedimentation basin.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which—

Fig. 1 is a plan view of a sedimentation unit particularly designed and constructed for use in the desilting of river water;

Fig. 1A shows a detail employed in the construction of Fig. 1 but on a somewhat larger scale than appears in Fig. 1;

Fig. 2 is a vertical view taken as on the plane indicated by the broken line 2—2 of Fig. 1 looking in the direction of the arrows;

Fig. 2A is a vertical sectional view, at a somewhat larger scale than Fig. 2, of a constructional detail and arrangement employed in Fig. 2;

Fig. 3 is a vertical sectional view, at a still larger scale, showing still more clearly certain constructional features, the assemblage relationship of which is indicated by Fig. 2A; and Fig. 4 is a horizontal view partially in section and at a somewhat larger scale than that employed in Fig. 3, and is a view taken as on the broken line 4—4 of Fig. 3 looking downwardly—as indicated by the arrows 4—4 of Fig. 3.

Reference will now be made to the drawings in detail.

Therefrom, in connection with the description herein set forth, one will readily appreciate how the invention hereof is embodied in and is useful in the functioning of the sedimentation or desilting unit as a whole and particularly in respect to the use of such unit in the desilting of river water.

The sedimentation unit embodies a sedimentation channel or basin collectively designated as 1. In the construction shown it has been formed and largely defined by the excavating of land to provide the sedimentation zone of the basin, and three portions of the boundary wall of the basin are provided by mounds or water retaining sections of earth left or formed as the result of the excavating operations. A fourth portion of the boundary wall of the sedimentation basin is provided by a concrete influent channel construction. There is thus provided an elongated or non-circular lagoon or lake, which affords a sedimentation basin of considerable size and extent.

The concrete influent channel construction just referred to is designated by 2. It has upstanding side or wall portions 3—3, and openings 4. The side walls 3—3 are arranged so that according to the horizontal view there is provided a progressively tapering influent channel 5 which in cross section gradually decreases in passing towards the forward or foremost discharge section thereof. The construction of this influent channel may be described as providing influent openings which are arranged at and along one side or end portion of the sedimentation basin. It will be seen, with reference in particular to Fig. 2, that these influent openings are provided by vertical slits having an extent from the very top of the influent channel to the floor thereof, thus eliminating any ledge over which the influent would have to flow and assuring that there will be effected in the influent channel a substantial scouring effect, preventing sedimentation or depositing of any of the silt in the influent channel. A weir construction is provided at and along the opposite side or end portion of the sedimentation basin by an extended mound or retaining section of earth 6 which is capped by a concrete construction at 7, and thus provides the weir which is slightly below the normal operating level of the sedimentation basin as indicated by the line 8 whereby—as the result of a continuous inflow of influent through the openings 4 of water to be subjected to sedimentation, that is, to a desilting operation—there can follow a continuous overflow as relatively clarified or desilted effluent of the supernatant of the sedimenting or desilting operation that is carried out within the sedimentation zone of the sedimentation trough or basin. The overflow past the weir is into a main effluent conduit or trough 9 which is in part defined by the mound or retaining section 6 heretofore referred to, and by a higher mound or retaining section 10. The other marginal or boundary wall portions of the sedimentation basin are provided by extended mound sections as 11 and 12, the top of which it will be apparent should extend substantially above the normal general level of the liquid as indicated by 8.

The concrete influent channel construction 2 extends to and within a main supply channel 13, the details of which it is not necessary to describe in connection with the present invention. It will be manifest, however, that provision should be made for interrupting the flow, as desired, from the channel 13 to and into the influent section 2, and to that end a valve or gate may be incorporated as at 14.

The sedimentation basin 1 may be considered as having or as comprising nested or adjacent sections indicated, for example, by the long and short heavy dash circles 15 in Fig. 1. In effect, these circles or the portions defined thereby may be considered as arranged in two rows, in each of which rows is provided or comprised a series of juxtaposed sections in which adjacent and merging floor portions or bottom sections defined, for example, as by circular sections 15 tangent to each other. The center lines for the two rows or longitudinally arranged series of circular portions may be considered as transversely spaced, and in the two rows the circular portions or successive bottom sections are arranged in respect to each other in such a manner that any one circular portion or bottom section is tangent to or merges into the other circular portions or bottom sections immediately adjacent thereto whereby, in respect to any three circular portions or bottom sections, of which each circular portion or bottom section merges into the other two circular portions or bottom sections, there results a triangular arrangement of which the center of each circular portion or bottom section is at the vertex of an acute angle of an equilateral triangle which is formed by lines connecting the centers. In this connection, note the equilateral triangle A—B—C formed by the lines A—B, B—C and C—A which connect the centers of three touching or merging circular portions or bottom sections. The retaining mound or marginal boundary wall sections or portions 11 and 12 in fact practically parallel certain lines connecting these centers or, as otherwise expressed, have an inclination of 60° in respect to the influent channel side walls 3. Or as otherwise expressed, the flow from the influent channel 2 across the sedimentation basin and ultimately over the weir 6 thereof is in a general direction which is at 60° in respect to the influent channel.

The floor or bottom sections defined by the circles 15 may be viewed as slightly coned—because of an inverted cone shaped or downwardly tapering interior—since there is a gradual and gentle downward slope in passing from the edge of the circular portion 15 towards the center thereof. This slope is manifest from an inspection of Fig. 2 and it is to be noted that the floor or bottom of the sedimentation basin is left relatively free and unobstructed without any substantial upward projections or cross walls between the several sections indicated by the circles 15.

In the construction shown there are left what may be considered as "islands" as at 16, 17, 18 and 19, but in connection with a desilting plant the sediment which will deposit upon these islands should not be found objectionable.

The floors as defined by the several sections 15 gradually merge from one into the other whereby any substantial upward projection is avoided and each section is served or provided with a solids-raking and collecting mechanism 20, frequently referred to as a solids-scraping and collecting assemblage, that is provided for raking settled solids deposited upon and within the sections 15, and for conveying solids collected thereby to and within an annular trench or trough 21, which is sometimes referred to as a solids collecting cone or sump and sometimes as a solids-receiving trough. This trough, which provides a receiving section into which collected solids are passed prior to their hydraulic delivery from the interior of the sedimentation zone or basin, is clearly indicated in Figs. 2A and 3.

Each floor or bottom section 15 has a stationary hollow upstanding pier or column 22, at the base of and around which said collecting trough is arranged, as clearly appears in Figs. 2A and 3. This hollow column 22 extends above the general liquid level as at 8 and is capped by any suitable frame member as 23 which serves as part of a turntable mechanism, by and through the medium of which the solids raking and conveying assemblage is rotatably mounted on and carried by said pier or column.

It will hereafter more clearly appear that the particular mechanism by which the solids raking and collecting assemblage is carried and operated is not an essential part of the present invention, mechanism for accomplishing this purpose being already old in the art, and an improved form or type of mechanism for this and which is particularly useful in connection with the present invention is being made the subject of a patent application being filed, to wit, an application of Charles H. Scott entitled "Sedimentation apparatus".

The pier or column 22 provides a chamber 24 which is open and accessible from the top but which is relatively closed at the bottom except for a conduit or pipe as 25 leading therefrom, the purpose of which will subsequently appear.

A construction herein referred to as an overflow pipe or conduit construction is broadly designated by 26, and it comprises pipe or conduit sections 27 which lead from the solids receiving or collecting trough 21 to, into and upwardly within the chamber 24. At the upper section of this pipe or conduit construction 26 there are provided vertically positionable or vertically adjustable pipe or sleeve-like elements 28 which are relied upon for determining the vertical elevation of an overflowing section of said overflow pipe construction. This section by being vertically positionable or adjustable can be and is relied upon to regulate to a certain extent the type of outflow from the trough or sump 21 or, in other words, to regulate or adjust the degree of solids concentration which will necessarily take place as the sedimentation unit operates in a continuous manner. The vertically positioning or adjusting of the overflow sections 28 can be accomplished in any suitable manner, and in the construction shown is accomplished by the vertically moving of the sections 28 by and through the medium of rods 29 and screw adjusting means 30.

There is sometimes desired the emptying of the entire content of the sedimentation basin, and to this end a stop valve or gate is provided in a part of the conduit construction that leads from the lowermost portion of the sedimentation basin.

The chamber 24 into which the liquid-solids mixture or silt flows from the receiving trough 21 past the overflow, is sometimes called a silt-receiving chamber. The overflow has been made vertically adjustable or, in other words, vertically positionable in order to determine, adjust or control the degree of solids concentration in the liquid-solids mixture which thus passes from the overflow to and into said chamber. This vertical adjustment of the overflow is effected by the vertically positioning of the part or parts 28.

From the chamber 24 the liquid-solids mixture or the silt flows through the conduit section 25, past the section 32, past the valve 33 therein, to and into a main silt-discharge conduit 34, as will be manifest from an inspection of Figs. 1, 1A and 3. In this manner the liquid-solids mixture obtained from the bottom of the sedimentation basin may be discharged exteriorly of the system to a point away from the effluent which passes from the sedimentation basin over the weir 7.

In the arrangement shown one sedimentation unit has been installed along one side portion of the influent channel 2. It will be manifest that a similar type of sedimentation unit can be installed along the opposite side portion of the same influent channel, and in this way a sedimentation or desilting unit of large capacity can be realized.

It may be advisable or necessary to effect a direct draining of the sedimentation basin, and to that end one of the overflow conduit constructions or some other pipe leading from the lowermost interior portion of the sedimentation zone is provided with a stop valve 36 which is normally closed but which when open allows a direct draining of the sedimentation basin. The valve 36 may be operated as through the valve stem extension 37 thereof and the hand wheel 38. It is to be noted that this stop valve 36 is considerably below the general elevation of the delivery section as determined by the overflow sections 28.

It is to be noted that the overflow sections 28 are well above the lowermost defines of the sedimentation basin, and in the particular type of apparatus shown they are located only a relatively short distance below the general operating level 8 of the liquid within the sedimentation basin. The higher the elevation of the overflow sections 28, the greater will be the degree of solids concentration in the liquid-solids mixture passing outwardly thereover.

The chamber 24 has heretofore been described as one which is accessible from the top, and for the purpose of inspection, repair or the like it is provided with members 39 which in effect constitute the steps or rounds of a ladder extending for the full depth of the chamber.

It is quite common in systems employing pipes or conduits through which solids are hydraulically conducted, to employ some type of flushing system in order to remove obstruction which may result from undue localized settling of solid matter. To that end each of the conduits 25 leading to the main discharge conduit 34 is provided with a valve-controlled pipe 40 through which water under pressure can be supplied for flushing operations. Such a pipe is indicated in Fig. 1A.

The main discharge conduits are located in subterranean chambers or tunnels 41 that are accessible to an operator. These subterranean chambers 41 are located below the sedimentation unit, viz., a slight distance below the lowermost portion of the sedimentation basin or trough, they are at least substantially co-extensive throughout and thereby there is permitted access to the discharge conduit sections at the places where they join the main discharge conduit 34. The portions 32 heretofore referred to provide the connecting sections, and the valves 33 thereof as well as the valves in the pressure pipelines 40 are accessible to the operator when he is in the subterranean tunnel or conduit section 41.

The adjustable flow conduit or pipe constructions by which overflow from the sedimentation device is adjustably regulated and delivered into the hollow pier corresponding thereto, constitute an invention of Wayne A. Kivell entitled "Sedimentation apparatus", the patent application on which is being filed concurrently herewith. While the Kivell invention just referred to has a general field of application, nevertheless the same has been particularly devised and designed for use in the present system or arrangement.

The present invention revolves about the neighboring or contacting arrangement of the floor or bottom sections, as 15, and include the neighboring or adjacent arrangement of the associated solids raking and collecting assemblages that operate over and which are associated with the floor or bottom sections, and which are provided whereby the major portion of the floor of the sedimentation basin is effectively within and under the operative influence thereof.

The invention is one which can be adjustably employed in practically any form of sedimentation unit where relatively large capacities are desired, and in this connection it is to be noted that in Fig. 1 a sedimentation basin or section is embodied in and defined by the influent wall 3, the opposite marginal wall section 6 and the marginal wall sections 11 and 12, all of which may be described as being located at one side of the influent channel construction 2. A similarly constructed or defined sedimentation basin may be considered as existing at the opposite side of the influent channel construction 2.

The design is also one which readily adapts itself to a multiplying of sedimentation capacities merely by the multiplying of the units herein described, or as otherwise expressed, the arrangements herein disclosed can be installed one after the other so as to receive influent passed thereto from a common main supply channel so that effluent passing therefrom can be conducted into a main delivery channel and so that the underflow therefrom can pass into discharge sections leading to a main discharge.

The construction hereof is one in which the sedimentation basins proper may in effect be formed largely by excavating or by depositing earth from and at the places desired and required, and this can even go so far as to the employing of the raking and collecting assemblages for the forming or shaping of the bed or floor sections immediately thereunder.

The sedimentation units as herein described are adaptable for all forms of sedimentation operations with the possible exceptions of that for sewage or other impure waters having therein organic solids of a character which would tend to putrefy should substantial collections of such solids tend to form in the "islands" such as 16, 17, 18 and 19, which are left as submerged floor sections at or adjacent the circular floor sections 15. For operating upon sewage, it would in general be advisable to eliminate these submerged "islands" either by extending them upwardly so that they will project above the general liquid level, or by providing the same with operating mechanism which can be relied upon for effecting a removal of the solids deposited thereupon to and into the circular sections adjacent thereto. As to the "island" sections such as 17, 18 and 19, these could be eliminated by causing a marginal section of the boundary walls to follow the general contour of the circles substantially up to the place where the circles become tangent to each other.

The solids raking and collecting assemblage may be of the type in which automatic lifting raking carrying arms are employed, such for example as are shown in the Charles H. Scott U. S. application Serial No. 26,532 filed June 14, 1935 and entitled "Sedimentation apparatus".

What is claimed is:

1. Sedimentation apparatus comprising a lagoon-like settling basin, an influent channel communicating with said basin and adapted to permit a substantially unobstructed flow of influent thereinto, marginal boundary wall sections at an angle of substantially 60° with said influent channel, a plurality of rotatable solids-raking mechanisms within said basin positioned with respect to one another so that lines connecting the axes of rotation of any adjacent three of said mechanisms will form an equilateral triangle, the paths defined by the outer ends of adjacent raking mechanisms being substantially tangent, a solids-receiving sump located adjacent the axis of rotation of each of said raking mechanisms, a main discharge conduit common to all of said sumps, conduit sections connecting said solids-receiving sumps with the main discharge conduit, an overflow weir associated with said basin, and an effluent conduit adapted to receive effluent discharged over said weir.

2. Sedimentation apparatus comprising a lagoon-like settling basin, a tapered influent channel extending along one side thereof and having openings communicating with said basin adapted to permit a flow of influent into said basin at an angle with said channel of approximately 60°, a plurality of rotatable solids-raking mechanisms within said basin positioned with respect to one another so that lines connecting the axes of rotation of any adjacent three of such mechanisms will form an equilateral triangle, the paths defined by the outer ends of adjacent raking mechanisms being substantially tangent, a solids-receiving sump located adjacent the axis of rotation of each of said raking mechanisms, a main discharge conduit common to all of said sumps located below the floor of said basin, conduit sections connecting said solids-receiving sumps with the main discharge conduit, an overflow weir extending along the side of said basin opposite the influent channel, and an effluent conduit paralleling said weir and adapted to receive effluent discharged thereover.

HAROLD BOYD COULTER.